May 23, 1933. G. E. WESTAD 1,910,075
TOP FOR AUTOMOBILE RUMBLE SEATS
Filed July 6, 1928 2 Sheets-Sheet 1
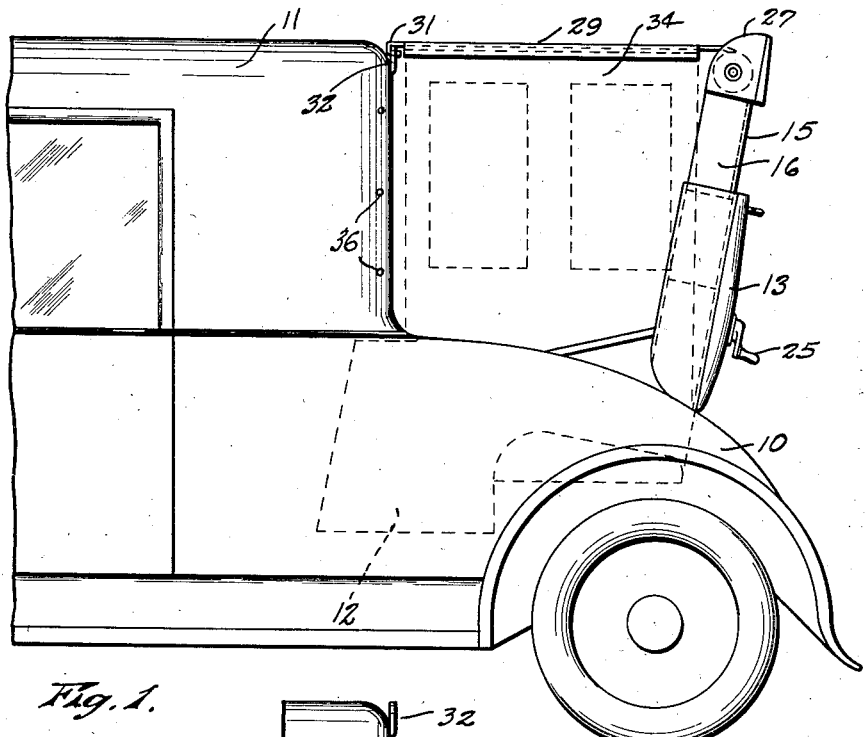
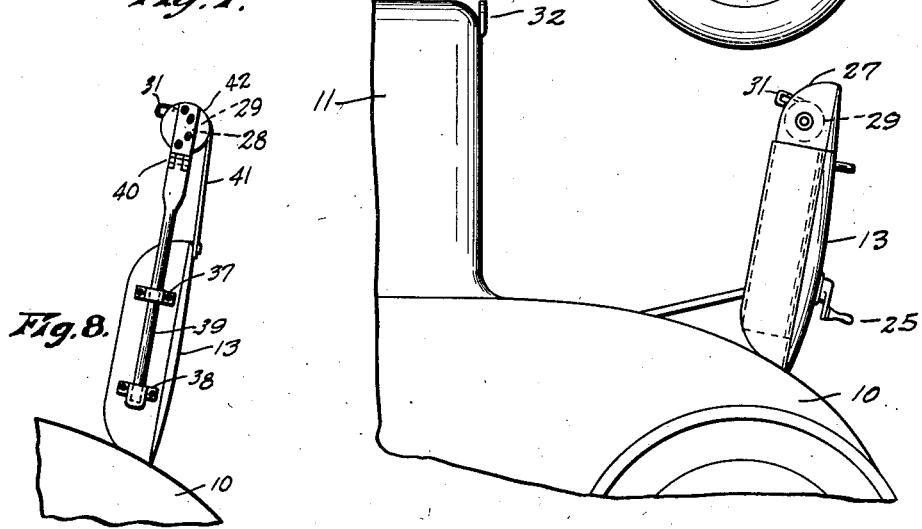
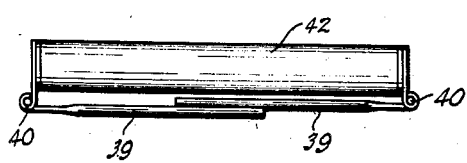
Inventor
George E. Westad
By Wooster & Davis
Attorneys

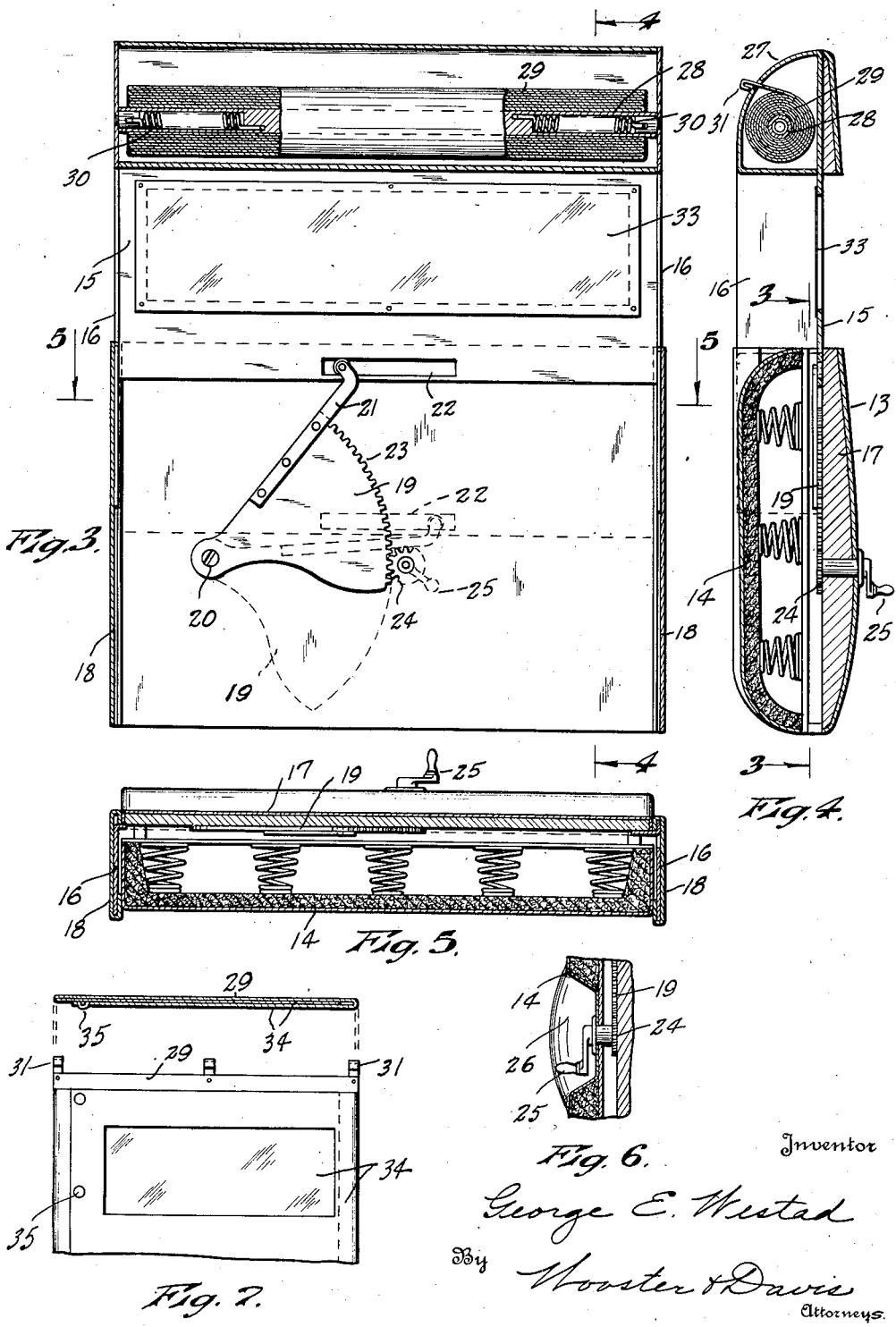

Patented May 23, 1933

1,910,075

UNITED STATES PATENT OFFICE

GEORGE E. WESTAD, OF STAMFORD, CONNECTICUT

TOP FOR AUTOMOBILE RUMBLE SEATS

Application filed July 6, 1928. Serial No. 290,729.

This invention relates to automobiles, particularly an improved rumble seat construction, and has for an object to provide an improved top for the rumble seat which may be quickly and easily placed in position or concealed and which will not in any material respect change the appearance of the rumble seat arrangement.

With the foregoing and other objects in view, the invention consists in certain novel features of construction combinations and arrangements of parts as will be more fully described in connection with the accompanying drawings. In these drawings, Fig. 1 is a side elevation of the rear part of an automobile showing my improvement in position with the top extended.

Fig. 2 is a similar view showing the top moved to its position when not in use, but showing the rumble seat back in the upright position.

Fig. 3 is a detail section substantially on line 3—3 of Fig. 4.

Fig. 4 is a vertical section substantially on line 4—4 of Fig. 3.

Fig. 5 is a transverse section substantially on line 5—5 of Fig. 3.

Fig. 6 is a detail section showing a slightly different arrangement of the operating means.

Fig. 7 is a partial plan and partial section of the top.

Fig. 8 is a side elevation of a somewhat different construction, and

Fig. 9 shows the top construction of Fig. 8 removed and folded to place in the rear compartment.

As is well known the rumble seat of an automobile is located to the rear of the ordinary or permanent top for the car, and is covered by a hinged back construction, which when the seat is not in use is folded down to cover or close the seat compartment, and the outer or rear wall thereof forms a continuation of the lines of the body of the car to give a neat and attractive appearance. In these constructions, however, when the back is raised for the use of the seat there is ordinarily no protection for occupants of the seat from the weather. I have provided an improved construction of top which forms a part of the construction of the back which may be extended from the top to the proper height to correspond with that of the car top, and when not in use may be folded or drawn into the structure of the back so that the back of the rumble seat may be closed in the ordinary manner, and my improvement will not in any material respects mar or change the appearance of the car.

In the drawing 10 represents the car body and 11 the permanent top therefor. In the rear part of the body back of the permanent top is the rumble seat compartment 12 opening through the top of the body which is closed by the hinged back section 13 carrying on its inner wall any approved type of cushion construction 14.

Built into this back construction is an extensible frame comprising a back portion 15 and side members 16 which is normally retracted into the back, as shown in Fig. 2, but may be extended as shown in Figs. 1, 3 and 4. The back portion 15 slides down between the rear wall 17 of the seat back and the cushion construction while the side members 16 extend in a direction transverse the direction of the back portion 15 and are guided in guideways 18 at the opposite edges of the seat back so as to slide vertically therein when the seat back is in the upright position. This frame or support 15 may be extended from or retracted into the seat back by any suitable operating means, for example, such as shown in Fig. 3. It comprises a segment 19 pivoted at 20 carrying an arm 21 having a roller running in a slot 22 in the back portion 15. The segment 19 has a rack 23 meshing with a pinion 24 operated by a handle 25 which may be either exposed at the rear wall of the seat back 13 or may be located at the inner or cushion side thereof in a recess 26 formed in the cushion, as shown in Fig. 6.

At the upper portion of the frame or support 15—16 is a head rest 27, which when the frame is in the retracted position of Fig. 2 forms a continuation for the seat back. It may be a hollow casing in which is mounted a spring operated roller 28 on which is wound a flexible top 29 of any suitable flexible waterproof material. Springs 30 of the roller tend to wind this top on the roller. Suitable hooks or eyes 31 may be provided at the free end of this top to engage complementary hooks or eyes 32 at the rear top portion of the permanent top 11 to thus hold the auxiliary top in proper position. It will be held taut and straight by the action of the springs 30.

In ordinary operation the frame 15—16 carrying the flexible top is retracted into the rumble seat back structure 13 as shown in Fig. 2, and this back may be folded down into the car in the ordinary manner or it may be used as the ordinary rumble seat back is used. If the occupants of the rumble seat wish to secure protection from the sun or rain, all that is necessary is to raise or extend the frame or support 15—16 by operating the handle 25 to any suitable height as indicated in Fig. 1, then draw forward the free end of the top 29 and secure it to the rear top portion of the permanent top 11. The rear wall 15 of the frame may have a window 33 of glass or other transparent material for rear vision.

The top 29 is also preferably provided with side portions or curtains 34 which are secured at their upper ends to the side edges of the main portion of the top 29, and when not in use are folded under this main top portion and secured to it by suitable snap or other type of fasteners 35, as indicated in Fig. 7. The entire top with the side curtains may be wound onto the roller 28, it being, of course, understood that the thickness of these members is greatly exaggerated in the drawing. Suitable fastening means may also be provided on the sides of the car body or the rear of the permanent top 11 for fastening these curtains in position, such for instance as button studs 36 or snap fasteners, to which the curtains are secured. When it is not desired to use the top the sides may be folded under the main top portion after which it may be wound on the roller 28 by merely disconnecting the fasteners 32, and then the frame 15—16 may be retracted into the back section, as shown in Fig. 2, and the device used as the ordinary rumble seat or folded back into the car body.

In Figs. 8 and 9 is shown a somewhat different construction for accomplishing the same purpose. In this form instead of having the support mounted in the back of the rumble seat, it is provided with loops or brackets 37 and 38 secured to the opposite ends thereof and the support for the top 29 comprises rods 39 at the opposite ends adapted to be inserted in the brackets 37 and 38 and held thereby in an upright position, as shown in Fig. 8. The roller 28 and its enclosing casing 42 is mounted at the upper ends of these rods and the curtain 29 may be unwound and secured to the back of the car top 11 the same as in the first form. When not in use the rods 39 are lifted from the brackets 37 and 38 and because of the hinges 40 they may be folded against the side of the roll enclosing casing and the entire attachment placed in the rumble seat compartment. When in the position of Fig. 8 the space between the roller casing and the top of the rumble seat may be closed by a back curtain 41.

It will be apparent that this is a very simple construction which may be easily and quickly extended to position for use or may be as easily and quickly folded back out of the way. It is also apparent it is so constructed that it is a part of the built-in structure of the rumble seat back and is so arranged that it does not change the usual appearance of this back. It is also very effective in protecting the occupants of the rumble seat.

Having thus set forth the nature of my invention, what I claim is:

1. In an automobile having a main seat, a top thereover and a body having a top wall extending rearwardly therefrom having an opening, a rumble seat to the rear of the main seat and top under said opening, a pivotally mounted back for the rumble seat adapted to be moved to an upright position to the rear of the rumble seat and to be folded forwardly from this position into the body of the car to close said opening, said back including a body section having a rear wall forming a continuation of the top wall of the car body when in closed position and a pad or cushion on the inner or front side thereof, said back including upright guides at the opposite ends thereof, an upper extension for said back having end members guided for sliding movement in said guides and a back member connecting said end members, a head rest forming the forward wall of said extension and forming a continuation of the cushion when the extension is in lowered position, a flexible top carried in the extension and secured thereto at one end, means for detachably securing the free end of the flexible top to the automobile top, and manually operated means for raising and lowering the support.

2. In an automobile having a main seat, a top thereover and a body having a top wall extending rearwardly therefrom having an opening, a rumble seat to the rear of the main seat and top under said opening, a pivotally mounted back for the rumble seat adapted to be moved to an upright position to the rear of the rumble seat and to be folded forwardly from this position into the body of the car to close said opening, said back including a body section having a rear wall forming a continuation of the top wall of the car body when in closed position and a pad or cushion on the inner or front side thereof, a support guided for sliding movement in the back and movable therewith, said support including a casing forming an extension of said body portion when the support is retracted into the back and having a front wall forming an extension of said cushion, manual means in the back for raising the support when the back is in the upright position, a roller mounted within the casing, a flexible top carried by the roller, and means for detachably securing the free end of the flexible top to the automobile top.

3. In an automobile having a main seat, a top thereover and a body having a top wall extending rearwardly therefrom having an opening, a rumble seat to the rear of the main seat and top under said opening, a pivotally mounted back for the rumble seat adapted to be moved to an upright position to the rear of the rumble seat and to be folded forwardly from this position into the body of the car to close said opening, said back including a body section having a rear wall forming a continuation of the top wall of the car body when in closed position and a pad or cushion on the inner or front side thereof, guides at the opposite ends of said back and movable therewith, a support guided for sliding movement in said guides and having a back wall within the rear wall of said movable back, a roller carried at the upper part of said support, a flexible top normally wound on said roller when not in use, manually operable means in the back for raising and lowering the support, and means for detachably securing the free end of the flexible top to the automobile top.

In testimony whereof I affix my signature.

GEORGE E. WESTAD.